(12) United States Patent
Kim

(10) Patent No.: US 10,397,601 B2
(45) Date of Patent: Aug. 27, 2019

(54) METHOD AND APPARATUS FOR CODING VIDEO, AND METHOD AND APPARATUS FOR DECODING VIDEO ACCOMPANIED BY INTER PREDICTION USING COLLOCATED IMAGE

(71) Applicant: SAMSUNG ELECTRONICS CO., LTD., Suwon-si (KR)

(72) Inventor: Il-koo Kim, Osan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/043,911

(22) Filed: Jul. 24, 2018

(65) Prior Publication Data
US 2018/0332300 A1 Nov. 15, 2018

Related U.S. Application Data

(63) Continuation of application No. 15/583,324, filed on May 1, 2017, now Pat. No. 10,034,014, which is a
(Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/103* (2014.11); *H04N 19/105* (2014.11);
(Continued)

(58) Field of Classification Search
CPC .... H04N 19/105; H04N 19/176; H04N 19/46; H04N 19/51; H04N 19/513;
(Continued)

(56) References Cited

U.S. PATENT DOCUMENTS

| 7,480,334 B2 | 1/2009 | Nair |
| 7,978,764 B2 | 7/2011 | Jung et al. |

(Continued)

FOREIGN PATENT DOCUMENTS

| CN | 1469632 A | 1/2004 |
| CN | 1487748 A | 4/2004 |

(Continued)

OTHER PUBLICATIONS

Bossen, Frank, "Common test conditions and software reference configurations," Joint Collaborative Team on Video Coding of ITU-T SG16 WP3 and ISO/IEC JTC1/SC29/WG11, JCTVC-E700, 4th Meeting, Daegu, KR, Jan. 20-28, 2011, 11 pages total.
(Continued)

*Primary Examiner* — Neil R Mikeska
(74) *Attorney, Agent, or Firm* — Sughrue Mion, PLLC

(57) ABSTRACT

Provided is an inter prediction method including determining a collocated block of a current block of a current image from among blocks of an image that is restored prior to the current image; preferentially checking whether a first reference list from among reference lists of the collocated block is referred to and selectively checking whether a second reference list is referred to according to whether the first reference list is referred to; based on a result of the checking, determining a single collocated reference list from among the first reference list and the second reference list; determining a reference block of the current block by using motion information of the collocated reference list; and performing inter prediction on the current block by using the determined reference block.

2 Claims, 14 Drawing Sheets

Related U.S. Application Data continuation of application No. 15/057,361, filed on Mar. 1, 2016, now Pat. No. 9,762,924, which is a continuation of application No. 14/671,466, filed on Mar. 27, 2015, now Pat. No. 9,313,517, which is a continuation of application No. 14/130,545, filed as application No. PCT/KR2012/005247 on Jul. 2, 2012, now Pat. No. 9,253,488.

(60) Provisional application No. 61/548,415, filed on Oct. 18, 2011, provisional application No. 61/504,177, filed on Jul. 2, 2011.

(51) Int. Cl.
*H04N 19/176* (2014.01)
*H04N 19/46* (2014.01)
*H04N 19/51* (2014.01)
*H04N 19/513* (2014.01)
*H04N 19/96* (2014.01)
*H04N 19/573* (2014.01)
*H04N 19/577* (2014.01)
*H04N 19/103* (2014.01)
*H04N 19/583* (2014.01)

(52) U.S. Cl.
CPC ........... *H04N 19/176* (2014.11); *H04N 19/46* (2014.11); *H04N 19/51* (2014.11); *H04N 19/513* (2014.11); *H04N 19/573* (2014.11); *H04N 19/577* (2014.11); *H04N 19/583* (2014.11); *H04N 19/96* (2014.11)

(58) Field of Classification Search
CPC .. H04N 19/577; H04N 19/103; H04N 19/583; H04N 19/52; H04N 19/573; H04N 19/96
See application file for complete search history.

(56) References Cited

U.S. PATENT DOCUMENTS

| | | | |
|---|---|---|---|
| 8,036,272 B2 | 10/2011 | Suzuki | |
| 8,971,411 B2 | 3/2015 | Kondo et al. | |
| 9,241,161 B2 | 1/2016 | Kondo et al. | |
| 9,313,517 B2 | 4/2016 | Kim | |
| 9,641,842 B2* | 5/2017 | Pandit | H04N 19/597 |
| 9,794,590 B2 | 10/2017 | Kim et al. | |
| 2004/0095996 A1 | 5/2004 | Mossakowski | |
| 2004/0136461 A1 | 7/2004 | Kondo et al. | |
| 2005/0117646 A1 | 6/2005 | Joch et al. | |
| 2005/0185713 A1 | 8/2005 | Winger et al. | |
| 2006/0133495 A1 | 6/2006 | Ye et al. | |
| 2007/0002946 A1 | 1/2007 | Bouton et al. | |
| 2007/0019731 A1 | 1/2007 | Huang | |
| 2007/0110157 A1 | 5/2007 | Jung | |
| 2007/0127571 A1 | 6/2007 | Makino | |
| 2007/0211802 A1 | 9/2007 | Kikuchi et al. | |
| 2008/0260034 A1 | 10/2008 | Wang et al. | |
| 2008/0279280 A1 | 11/2008 | Iguchi et al. | |
| 2009/0010337 A1 | 1/2009 | Wang | |
| 2009/0074073 A1 | 3/2009 | Srinivasan et al. | |
| 2009/0100462 A1 | 4/2009 | Park et al. | |
| 2009/0116759 A1 | 5/2009 | Suzuki et al. | |
| 2010/0053357 A1 | 3/2010 | Ikeda | |
| 2010/0118940 A1 | 5/2010 | Yin et al. | |
| 2010/0118970 A1 | 5/2010 | Ye et al. | |
| 2010/0158114 A1 | 6/2010 | Koo et al. | |
| 2010/0260262 A1 | 10/2010 | Coban et al. | |
| 2010/0266042 A1 | 10/2010 | Koo et al. | |
| 2011/0007802 A1 | 1/2011 | Karczewicz et al. | |
| 2011/0085593 A1 | 4/2011 | Wang et al. | |
| 2011/0090964 A1 | 4/2011 | Xu et al. | |
| 2011/0211640 A1 | 9/2011 | Kim et al. | |
| 2011/0216640 A1 | 9/2011 | Kim et al. | |
| 2011/0261882 A1 | 10/2011 | Zheng et al. | |
| 2012/0224637 A1 | 9/2012 | Sugio et al. | |
| 2012/0263229 A1 | 10/2012 | Lim et al. | |
| 2013/0202039 A1 | 8/2013 | Song et al. | |
| 2013/0336400 A1 | 12/2013 | Jeon | |
| 2013/0336402 A1 | 12/2013 | Xu et al. | |
| 2014/0192891 A1 | 7/2014 | Alshina et al. | |
| 2015/0071351 A1 | 3/2015 | Lee et al. | |
| 2015/0264394 A1 | 9/2015 | Jeon | |
| 2015/0382020 A1* | 12/2015 | Chen | H04N 19/597 348/43 |
| 2016/0198139 A1* | 7/2016 | Lin | H04N 19/597 348/43 |

FOREIGN PATENT DOCUMENTS

| | | |
|---|---|---|
| CN | 1518833 A | 8/2004 |
| CN | 1976455 A | 6/2007 |
| CN | 101043626 A | 9/2007 |
| CN | 101578866 A | 11/2009 |
| CN | 101669367 A | 3/2010 |
| CN | 101715137 A | 5/2010 |
| CN | 102045563 A | 5/2011 |
| EP | 2207351 A1 | 7/2010 |
| JP | 2004-23458 A | 1/2004 |
| JP | 2004-208258 A | 7/2004 |
| KR | 2003-0080985 A | 10/2003 |
| KR | 10-2006-0027819 A | 3/2006 |
| KR | 10-2006-0109440 A | 10/2006 |
| KR | 10-2011-0009141 A | 1/2011 |
| KR | 10-2011-0068897 A | 6/2011 |
| KR | 1020130116209 A | 10/2013 |
| RU | 2 276 470 C2 | 5/2006 |
| RU | 2368095 C1 | 9/2009 |
| RU | 2 413 385 C2 | 2/2011 |
| TW | 200607353 | 2/2006 |
| TW | 201028007 A | 7/2010 |
| TW | 201031220 A | 8/2010 |
| TW | 201106702 A1 | 2/2011 |
| TW | 201106704 A1 | 2/2011 |
| WO | 2005/093661 A2 | 10/2005 |
| WO | 2006069297 A1 | 6/2006 |
| WO | 2007/114609 A1 | 10/2007 |
| WO | 2007/114610 A1 | 10/2007 |
| WO | 2008/091117 A1 | 7/2008 |
| WO | 2010/050706 A2 | 5/2010 |
| WO | 2010/062466 A2 | 6/2010 |
| WO | 2010/120928 A1 | 10/2010 |
| WO | 2012/117728 A1 | 9/2012 |
| WO | 2013005963 A2 | 1/2013 |

OTHER PUBLICATIONS

Bross et al., "WD4: Working Draft 4 of High-Efficiency Video Coding", Joint Collaborative Teacm on Video Coding (JCT-VC) of ITU-T SG16 WP3 and ISO/IEC JTC1/SC29/WG11, Jul. 14-22, 2011, 229 pages total, Torino, IT.

Communication dated Dec. 16, 2014 issued by the Japanese Patent Office in counterpart Japanese Patent Application No. 2014-518819.

Communication dated Dec. 2, 2015, issued by the Taiwanese Intellectual Property Office in counterpart Taiwanese Application No. 101123849.

Communication dated Feb. 23, 2015 issued by the European Patent Office in counterpart European Patent Application No. 12807521.5.

Notice of Allowance, issued by the Korean Intellectual Property Office, dated Jan. 19, 2015, in counterpart Korean Application No. 10-2012-0071976.

Notice of Allowance, issued by the Korean Intellectual Property Office, dated Mar. 13, 2015, in counterpart Korean Application No. 10-2014-0054360.

Sugio, Toshiyasu, et al., "Modified derivation process of temporal motion vector predictor," Joint Collaborative Team on Video Coding of ITU-T SG16 WP3 and ISO/IEC JTC1/SC29/WG11, JCTVC-D273, 4th Meeting, Daegu, KR, Jan. 20-28, 2011, 19 pages total.

Toshiuasu Sugio et al.; "CE9: Experiment A, I, J and S Modified Derivation Process of Reference Index for Skip Mode and Temporal

(56) References Cited

OTHER PUBLICATIONS

Motion Vector Predictor"; Joint Collaborative Team on Video Coding (JCT-VC) of ITU-T SG16 WP3 and ISO/IEC JTC1/SC29/WG11; Mar. 10, 2011; 7 pages total; http://phenix.it-sudparis.eu/jct/doc end user/documents5 Geneva/wg11/JCTVC-E230-v2.zip.
Toshiyasu Sugio et al.; "Modified Derivation Process of Temporal Motion Vector Predictor"; Joint Collaborative Team on Video Coding (JCT-VC) of ITU-T SG16 WP3 and ISO/IEC JTC1/SC29/WG11; Jan. 15, 2011; 4 pages total; http://wftp3.itu.int/av-arch/jctvc-site/; XP030008313.
Communication dated May 26, 2015 issued by Japanese Intellectual Property Office in counterpart Japanese Application No. 2015-084254.
Communication dated May 26, 2015 issued by Japanese Patent Office in counterpart Japanese Application No. 2014-518819.
Communication dated May 26, 2015 issued by Japanese Patent Office in counterpart Japanese Application No. 2015-084253.
Communication dated Aug. 17, 2015 by the Korean Intellectual Patent Office in related Application No. 10-2014-0148739.
Communication dated Aug. 17, 2015 by the Korean Intellectual Patent Office in related Application No. 10-2015-0056011.
Communication, issued by the Japanese Patent Office, dated Dec. 16, 2014, in counterpart Japanese Application No. 2014-518819.
Communication, issued by the Korean Intellectual Property Office, dated Dec. 11, 2014, in counterpart Korean Application No. 10-2014-0054360.
Communication, issued by the Korean Intellectual Property Office, dated May 29, 2014, in counterpart Korean Application No. 10-2012-0071976.
Il-Koo Kim et al.; Experiments on Tools in Working Daft (WD) and HEVC Test Mode (HM-3.0); Joint Collaborative Team on Video Coding (JCT-VC) of ITU-T SG16 WP3 and ISO/IEC JTC1/SC29/WG11; Jul. 1, 2011; 12 pages total; http://wftp3.itu.int/av-arch/jctvc-site/; XP030009488.
Il-Koo Kim et al.; "Reduction of Reference Picture List Checking for Temporal Motion Vector Prediction"; Joint Collaborative Team on Video Coding (JCT-VC) of ITU-T SG16 WP3 and ISO/IEC JTC1/SC29/WG11; Jul. 4, 2011; 4 pages total; http://wftp3.itu.int/av-arch/jctvc-site/; XP030009610.
Il-koo Kim et al; "Reduction of reference picture list checking for temporal motion vector prediction"; Joint Collaboration Team on Video Coding (JCT-VC) of ITU-T SG16 WP3 and ISO/IEC JTC1/SC29/WG11; Jul. 14-22, 2011; 11 pgs. total (Doc. No. JCTVC-F587).
International Search Report (PCT/ISA/210), dated Jan. 2, 2013, issued by the International Searching Authority in counterpart International Patent Application No. PCT/KR2012/005247.
ITU/ISO/IEC, Copyright (c) 2010-2011, 1006 pages total, https://hevc.hhi.fraunhofer.de/svn/svn_HEVCSoftware/tags/HM-3.0/.
ITU/ISO/IEC, Copyright (c) 2010-2011, 4 pages total, https://hevc.hhi.fraunhofer.de/svn/svn_HEVCSoftware/tags/HM-3.0/.
Jian-Liang Lin et al.; "Improved Advanced Motion Vector Prediction"; Joint Collaborative Team on Video Coding (JCT-VC) of ITU-T SG16 WP3 and ISO/IEC JTC1/SC29/WG11; Jan. 23, 2011; 8 pages total; XP030047446.
Kimihiko Kazui et al.; "Improvement on Deviation Process for Luma Motion Vector Prediction"; Joint Collaborative Team on Video Coding (JCT-VC) of ITU-T SG16 WP3 and ISO/IEC JTC1/SC29/WG11; Jul. 1, 2011; 7 pages total; http://wftp3.itu.int/av-arch/jctvc-site/; XP030009165.
Kiran Misra et al.; "Improved CABAC Context Initialization"; Joint Collaborative Team on Video Coding (JCT-VC) of ITU-T SG16 WP3 and ISO/IEC JTC1/SC29/WG11; Jul. 1, 2011; 4 pages total; http://phenix.it-sudparis.eu/jct/doc_end_user_documents/6_Torino/wg11/JCTVC-F593-v1.zip.
Markus Flierl; "Generalized B Pictures and the Draft H.264/AVC Video-Compression Standard"; IEEE Transactions on Circuits and Systems for Video Technology; vol. 13; No. 7; Jul. 1, 2003; pp. 587-597; XP011099251.

Minhua Zhou; "A Study on Unification of JCTVC-D273 and JCTVC-D164 in HM2.0 Software"; Joint Collaborative Team on Video Coding (JCT-VC) of ITU-T SG16 WP3 and ISO/IEC JTC1/SC29/WG11; Mar. 10, 2011; 3 pages total; XP030048201.
Minhua Zhou; Cross Verification of Samsung's Proposal JCTVC-F587 on Reduction of Reference Picture List Checking for Temporal Motion Vector Prediction; Joint Collaborative Team on Video Coding (JCT-VC) of ITU-T SG16 WP3 and ISO/IEC JTC1/SC29/WG11; Jul. 9, 2011; 3 pages total; XP030049664.
Toshiyasu Sugio et al; "Modified usage of predicted motion vectors in forward directional bi-predictive coding frame"; Joint Collaborative Team on Video Coding (JCT-VC) of ITU-T SG16 WP3 and ISO/IEC JTC1/SC29/WG11; Jan. 20-28, 2011; 8 pgs. total (Doc. No. JCTVC-D274).
Written Opinion (PCT/ISA237), dated Jan. 2, 2013, issued by the International Searching Authority in counterpart International Patent Application No. PCT/KR2012/005247.
Yusuke Itani et al; "TE1 report: implicit direct vector derivation"; Joint Collaborative Team on Video Coding (JCT-VC) of ITU-T SG16 WP3 and ISO/IEC JTC1/SC29/WG11; Oct. 7-15, 2010; 11 pgs. total (Doc. No. JCTVC-C124).
Communication dated Dec. 22, 2015 by the Taiwanese Intellectual Patent Office in counterpart Taiwanese Application No. 104123720.
Notice of Allowance dated Dec. 28, 2015 issued by the Taiwanese Patent Office in counterpart Taiwanese Patent Application No. 104123718.
Communication dated Jan. 6, 2016 issued by the Chinese Intellectual Property Office in counterpart Chinese Patent Application No. 201510190931.7.
Communication dated Mar. 29, 2016, issued by the Japanese Intellectual Property Office in counterpart Japanese Application No. 2015-084255.
Communication dated Mar. 29, 2016, issued by the Japanese Intellectual Property Office in counterpart Japanese Application No. 2015-084256.
Communication dated Apr. 7, 2016, issued by the Korean Intellectual Property Office in counterpart Korean Application No. 10-2015-0056010.
Communication dated May 6, 2016, issued by the Russian Intellectual Property Office in counterpart Russian Application No. 2014103484/08(005365).
Communication dated Jun. 1, 2016, issued by the the State Intellectual Property Office of P.R. China in counterpart Chinese Application No. 201280042736.4.
Communication dated Jul. 26, 2016, issued by the Russian Patent Office in counterpart Russian application No. 2014103484/08(005365).
Communication dated Sep. 12, 2016, issued by the State Intellectual Property Office of P.R. China in counterpart Chinese application No. 201510190816.X.
Communication dated Oct. 9, 2016, from the State Intellectual Property Office of People's Republic of China in counterpart Application No. 201510190960.3.
Communication dated May 26, 2017 by the Taiwan Intellectual Property Office in counterpart Taiwanese Patent Application No. 104123722.
Communication dated Oct. 11, 2017, issued by the State Intellectual Property Office of P.R. China in counterpart Chinese application No. 201510440982.0.
Communication dated Nov. 2, 2017, issued by the Indonesian Patent Office in counterpart Indonesian application No. P-00201400550.
Communication issued by the Russian Federal Service for Intellectual Property dated Feb. 21, 2018 in counterpart Russian Patent Application No. 2017135405.
Communication issued by the Taiwan Intellectual Property Office dated May 3, 2018 in counterpart Taiwanese Patent Application No. 106121173.
Decision to Grant issued Mar. 6, 2019 by the Russian Federal Service for Intellectual Property in counterpart Russian Patent Application No. 2018127138.

* cited by examiner

ENCODING UNIT (1010)

PREDICTION UNIT (1060)

METHOD AND APPARATUS FOR CODING VIDEO, AND METHOD AND APPARATUS FOR DECODING VIDEO ACCOMPANIED BY INTER PREDICTION USING COLLOCATED IMAGE

CROSS-REFERENCE TO RELATED APPLICATIONS

This application is a continuation of U.S. application Ser. No. 15/583,324, filed on May 1, 2017, which is a continuation of U.S. application Ser. No. 15/057,361, filed on Mar. 1, 2016, issued as U.S. Pat. No. 9,762,924 on Sep. 12, 2017, which is a continuation of U.S. application Ser. No. 14/671,466, filed on Mar. 27, 2015, in the U.S. Patent and Trademark Office, issued as U.S. Pat. No. 9,313,517 on Apr. 12, 2016, which is a continuation of U.S. application Ser. No. 14/130,545, filed on Jan. 16, 2014, in the U.S. Patent and Trademark Office, issued as U.S. Pat. No. 9,253,488 on Feb. 2, 2016, which is a National Stage application under 35 U.S.C. § 371 of PCT/KR2012/005247, filed on Jul. 2, 2012, which claims the benefit of U.S. Provisional Application No. 61/504,177 filed on Jul. 2, 2011, and U.S. Provisional Application No. 61/548,415, filed on Oct. 18, 2011, the disclosures of which are incorporated herein by reference in their entireties.

BACKGROUND

1. Field

Exemplary embodiments relate to a method and apparatus for encoding a video via inter prediction and motion compensation and a method and apparatus for decoding a video via inter prediction and motion compensation.

2. Related Art

As hardware for reproducing and storing high resolution or high quality video content is being developed and supplied, a need for a video codec for effectively encoding or decoding the high resolution or high quality video content is increasing. According to a related video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed for each respective block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

SUMMARY

Aspects of one or more exemplary embodiments provide an inter prediction method and apparatus for determining a reference image by using a collocated picture, a video encoding method and a video decoding method via inter prediction, and a video decoding method and a video decoding apparatus via inter prediction.

According to aspects of one or more exemplary embodiments, there is provided an inter prediction method including determining a collocated block of a current block of a current image from among blocks of an image that is restored prior to the current image; preferentially checking whether a first reference list from among reference lists of the collocated block is referred to and selectively checking whether a second reference list is referred to according to whether the first reference list is referred to; based on a result of the checking, determining a single collocated reference list from among the first reference list and the second reference list; determining a reference block of the current block by using motion information of the collocated reference list; and performing inter prediction on the current block by using the determined reference block.

Also, according to aspects of one or more exemplary embodiments, the inter prediction apparatus may preferentially check the first reference list including reference images positioned in an opposite direction to a direction from the current block to the collocated block in the collocated picture without checking all of a plurality of references images included in the reference list of the collocated block in order to determine the reference image of the current block. The inter prediction apparatus may selectively check the remaining reference lists. Thus, an unnecessary process is skipped in a process for determining the reference image of the current block by using the collocated block, thereby increasing the efficiency of a process of determining the reference image for inter prediction.

According to an aspect of an exemplary embodiment, there is provided an inter prediction method including determining a collocated block of a current block of a current image from among blocks of an image that is restored prior to the current image; preferentially checking whether a first reference list from among reference lists of the collocated block is referred to and selectively checking whether a second reference list is referred to according to whether the first reference list is referred to; based on a result of the checking, determining a single collocated reference list from among the first reference list and the second reference list; determining a reference block of the current block by using motion information of the collocated reference list; and performing inter prediction on the current block by using the determined reference block.

The first reference list may include images that are positioned opposite to a direction from the current image to the collocated block.

The selective checking of the second reference list may include when the first reference list is referred to for inter prediction, skipping an operation for checking whether the second reference list is referred to.

The determining of the collocated reference list may include, when a picture order count (POC) number of an image of the collocated block is always smaller than that of the current image, determining a reference list of the current block as the single collocated reference list.

The selective checking of the second reference list may include checking the first reference list or the second reference list according to whether motion information of the first reference list or the second reference list exists.

According to another aspect of an exemplary embodiment, there is provided an inter prediction apparatus including a collocated reference list checking unit for determining a collocated block of a current block of a current image from among blocks of an image that is restored prior to the current image, and preferentially checking whether a first reference list from among reference lists of the collocated block is referred to and selectively checking whether a second reference list is referred to according to whether the first reference list is referred to; a reference block determiner for, based on a result of the checking, determining a single collocated reference list from among the first reference list and the second reference list, and determining a reference block of the current block by using motion information of the collocated reference list; and an inter prediction unit for performing inter prediction on the current block by using the determined reference block.

According to another aspect of an exemplary embodiment, there is provided a video decoding apparatus including a parser for performing entropy decoding on a bit string obtained by parsing a received bit stream to restore samples; an inverse transformer for performing inverse quantization and inverse transformation on a quantized transformation coefficient from among the restored samples to restore samples; an intra predictor for performing intra prediction on blocks in an intra prediction mode from among the samples restored by the inverse transformer; and a motion compensator for preferentially checking whether a first reference list from among reference lists of a collocated block of the current block, selectively checking whether a second reference list is referred to according to whether the first reference list is referred to, determining a single collocated reference list from among the first reference list and the second reference list based on a result of the checking, and performing inter prediction on the current block by using a reference block of the current block based on motion information of the collocated reference list, for performing inter prediction on a current block in an inter mode from among the samples restored by the inverse transformer; and a restorer for restoring an image by using blocks that are restored via the inter prediction or the intra prediction.

According to another aspect of an exemplary embodiment, there is provided a video encoding apparatus including an intra predictor for performing intra prediction on blocks in an intra prediction mode from among blocks of a video; an inter predictor for preferentially checking whether a first reference list from among reference lists of a collocated block of the current block is referred to, selectively checking whether a second reference list is referred to according to whether the first reference list is referred to, determining a single collocated reference list from among the first reference list and the second reference list based on a result of the checking, and performing inter prediction on the current block by using a reference block of the current block based on motion information of the collocated reference list, for inter prediction of a current block in an inter mode; a transformation quantizer for performing transformation and quantization on a result of the intra prediction or the inter prediction; and an output unit for outputting a bitstream generated by performing entropy encoding on samples including a quantized transformation coefficient generated as a result of the transformation and the quantization.

According to another aspect of an exemplary embodiment, there is provided a computer readable recording medium having recorded thereon a program for executing the inter prediction method.

DETAILED DESCRIPTION OF EXEMPLARY EMBODIMENTS

Hereinafter, an inter prediction method and apparatus using a reference list of a collocated block will be described with reference to FIGS. 1 through 5. A video encoding method and a video decoding apparatus via inter prediction will be described with reference to FIGS. 5 and 6. In addition, a video encoding method and a video decoding apparatus via inter prediction based on a coding unit having a tree structure will be described with reference to FIGS. 7 through 19. Hereinafter, the term 'image' may refer to a still image or a moving picture, that is, a video itself.

First, with reference to FIGS. 1 through 4, an inter prediction method and an inter prediction apparatus using a reference list of a collocated block according to an exemplary embodiment will be described. In addition, with reference to FIGS. 5 and 6, a video encoding method and a video decoding method via inter prediction according to an exemplary embodiment will be described.

Figure 1:
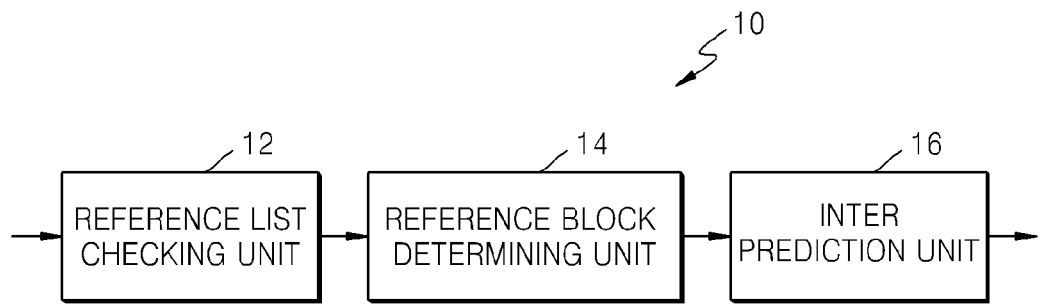
FIG. 1 is a block diagram of an inter prediction apparatus according to an exemplary embodiment.

FIG. 1 is a block diagram of an inter prediction apparatus 10 according to an exemplary embodiment.

The inter prediction apparatus 10 includes a reference list checking unit 12 (e.g., a reference list checker), a reference block determining unit 14 (e.g., a reference block determiner), and an inter prediction unit (e.g., an inter predictor) 16.

The inter prediction apparatus 10 encodes each video image for each respective block. A block may have a square shape, a rectangular shape, or any geometric shape and is not limited to a data unit having a predetermined size. According to an exemplary embodiment, a block may be a maximum coding unit, a coding unit, a prediction unit, a transformation unit, or the like from among coding units according to a tree structure. Video encoding and decoding methods based on coding units according to a tree structure will be described below with reference to FIGS. 7 through 19.

The reference list checking unit 12 may determine a collocated block of a current block of a current image from among blocks of an image that is restored prior to the current image. The collocated block of the current block of the current image may be determined from among the blocks of the image that is restored prior to the current image, and then, a collocated block positioned at a block location in a collocated picture, corresponding to a block location of the current block in the current image, may be determined.

The reference list checking unit 12 may determine a reference list of the current block by using a reference list of the collocated block.

The reference list checking unit 12 may check whether a first reference list from among reference lists of the collocated block is preferentially referred to. The first reference list according to the present embodiment may include images that are positioned in an opposite direction to a direction from the current image to the collocated block in the collocated block.

The reference list checking unit 12 may selectively check whether a second reference list is referred to, according to whether the first reference list is referred to. When the first reference list is referred to, it does not have to be checked whether the second reference list is referred to.

When the first reference list is referred to for inter prediction of the collocated block, the reference list checking unit 12 may skip a process of checking whether the second reference list is referred to.

The reference list checking unit 12 may check whether the first reference list or the second reference list is referred to, according to whether motion information of the first reference list or the second reference list exists.

The reference block determining unit 14 may determine a reference block of the current block according to a result of the checking whether the first reference list or the second reference list is referred to.

The reference block determining unit 14 may determine a single collocated reference list from among the first reference list and the second reference list. When the reference block determining unit 14 checks that the first reference list is capable of being referred to, the reference block determining unit 14 determines that the first reference list is the collocated reference list. When the reference block determining unit 14 checks that the second reference list is capable of being referred to, the reference block determining unit 14 determines that the second reference list is the collocated reference list.

The reference block determining unit 14 may determine the reference block of the current block by using motion information of the collocated reference list. A collocated reference image may be determined according to the collocated reference list. A reference image of the current image may be determined according to a direction and distance from the collocated picture to the collocated reference image. In addition, motion information of the current block may be determined by modifying motion information of the collocated reference list in proportion to the direction and distance from the collocated picture to the collocated reference image, and the reference block may be determined in the reference image of the current image according to the modified motion information of the collocated reference list.

However, when a picture order count (POC) number of an image of the collocated block is always smaller than that of the current image, the reference block determining unit 14 may replace the collocated reference list with the reference list of the current block. Thus, the reference image of the current block may be determined according to the reference list of the current block.

The reference block determining unit 14 may determine the reference image of the current block according to the reference list of the current block in a low-delay condition for preventing video encoding from being delayed. For example, when a list 0 and a list 1 of the reference list of the current block include the same reference images, that is, in a generalized P and B (GPB) mode, the reference image may be determined according to the reference list of the current block. When a current condition to decode an image in satisfies the low-delay condition, the reference block determining unit 14 may determine the reference image of the current block according to the reference list of the current block.

The inter prediction unit 16 may perform inter prediction on the current block by using the reference block determined by the reference block determining unit 14.

The inter prediction apparatus 10 may include a central processor (not shown) for generally controlling the reference list checking unit 12, the reference block determining unit 14, and the inter prediction unit 16. Alternatively, the reference list checking unit 12, the reference block determining unit 14, and the inter prediction unit 16 may be controlled by respective processors (not shown) and the processors may cooperatively interact with each other so as to control an overall operation of the inter prediction apparatus 10. Alternatively, the reference list checking unit 12, the reference block determining unit 14, and the inter prediction unit 16 may be controlled according to control of an external processor (not shown) of the inter prediction apparatus 10.

The inter prediction apparatus 10 may include at least one data storage unit (not shown) for storing data that is input to and output from the reference list checking unit 12, the reference block determining unit 14, and the inter prediction unit 16. The inter prediction apparatus 10 may include a controller (not shown) for controlling input/output of data of a data storage unit (not shown).

The inter prediction apparatus 10 may preferentially check the first reference list including reference images positioned in an opposite direction to a direction from the current block to the collocated block in the collocated picture. The inter prediction apparatus 10 may selectively check the remaining reference lists, without checking all of a plurality of references images included in the reference list of the collocated block, in order to determine the reference image of the current block.

When the inter prediction apparatus 10 checks that the first reference list of the collocated block is used for inter prediction of the collocated picture, since the inter prediction apparatus 10 may determine the reference image of the current block based on the first reference list of the collocated block, a process for rechecking whether the remaining references of the collocated block are referred to may be skipped. Thus, an unnecessary process is skipped in a process for determining the reference image of the current block by using the collocated block, thereby increasing the efficiency of a process of determining the reference image for inter prediction.

Figure 2:
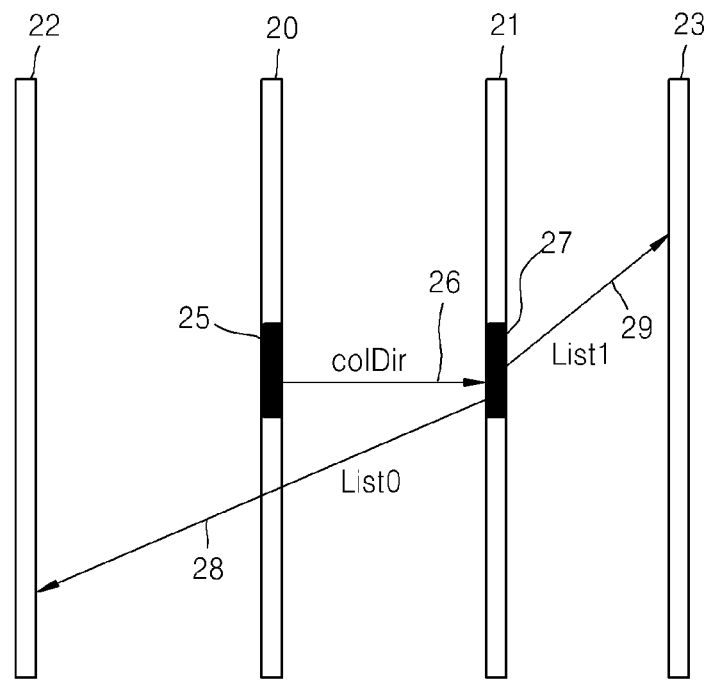
FIG. 2 shows a method of determining a reference image by using a collocated block.

FIG. 2 shows a method of determining a reference image by using a collocated block.

A reference image of a current block 25 of a current image 20 may be determined with reference to a reference list of a collocated block 27 of the current block 25.

Indexes of reference lists may be expressed by List 0 28 and List 1 29. According to a POC order of images 22, 20, 21, and 23, a reference list including reference images ahead of the current image 20 may be expressed by List 0 L0 and reference images including reference images behind the current image 20 may be expressed by List 1 L1.

A value 'colDir' of a collocated picture 21 of the current block 25 indicates a direction toward the collocated picture 21. Since the collocated picture 21 is included in a list 1 26 of the current image 20, the 'colDir' may be 1. As another example, a 'collocated_from_l0_flag' value may be used as a parameter for searching for the collocated picture 21. The 'collocated_from_l0_flag' value may indicate that the collocated picture 21 is an image of the list 0 of the current image 20. Thus, the value 'collocated_from_l0_flag' of the current image 20 may be determined as 0.

The collocated block 27 may be positioned at a block location in the collocated picture 21, corresponding to a block location of the current block 25 in the current image 20. In a related method, a reference image of the current block 25 may be determined by checking whether both a list 0 28 and a list 1 29 of a reference list of the collocated block 27 are referred to.

Typically, the reference image of the current block 25 may be determined from the collocated block 27 in a reference direction across the current image 20. Since the reference direction across the current image 20 from the collocated block 27 is a direction toward the list 0 28, the reference image of the current block 25 is likely to be positioned in the direction toward the list 0 28. Thus, in the related method, even if a process of checking whether the list 1 29 is referred to is likely to be unnecessary, whether both the list 0 28 and the list 1 29 of the reference list of the collocated block 27 are referred to needs to be checked.

Figure 3:
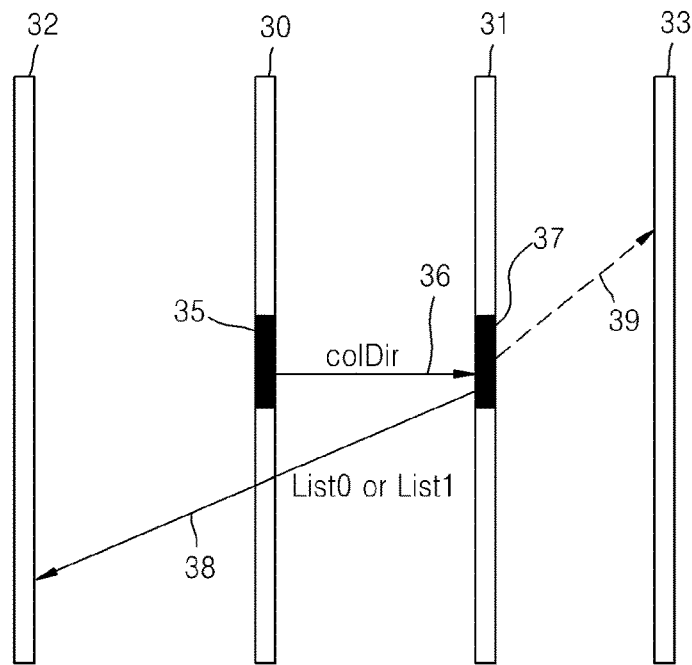
FIG. 3 shows a method of determining a reference image by using a collocated block, according to an exemplary embodiment.

FIG. 3 shows a method of determining a reference image by using a collocated block, according to an exemplary embodiment.

Generally, a reference image of a current block 35 may be determined from a collocated block 37 in a reference direction across a current image 30. That is, if a collocated picture 31 is included in a list 1 36 of the current block 35, the reference image of the current block 35 is likely to be determined from the collocated block 37 in a reference direction toward a list 0 38 across the current image 30.

If another collocated picture is positioned in the reference direction toward the list 0 38, the reference image of the current block 35 is likely to be determined from the collocated picture in a reference direction toward the list 1 36 across the current image 30.

Thus, according to the present embodiment, in order to determine the reference image of the current block 35, the inter prediction apparatus 10 may preferentially check whether a single reference list from among reference lists, that is, the lists 0 and 1 38 and 39 of a collocated block 37 is referred to. Whether a corresponding reference list is referred to may be determined according to whether the collocated block 37 has motion information about the corresponding reference list as a result of whether the corresponding reference list has been previously referred to during restoring the collocated block 37.

If the reference list that is preferentially checked has not been used for inter prediction of the collocated block 37, the inter prediction apparatus 10 may check whether the remaining reference list of the collocated block 37 is referred to.

As described above, a reference list may be determined from the collocated block 37 in the reference direction across the current image 30. Thus, if the collocated picture 31 is included in the list 1 36 of the current block 35, the inter prediction apparatus 10 may check whether the list 0 38 is referred to from the collocated block 37 along a direction across the current image 30. When it is determined that the list 0 38 is referred to, it does not have to be checked whether a list 1 39 is referred to. However, if images of the list 0 38 of the collocated block 36 are not referred to for inter prediction, the inter prediction apparatus 10 may simply check whether the list 1 39 of the collocated block 36 is referred to.

Similarly, if a collocated picture of a current block is included in a list 0 of the current block, the inter prediction apparatus 10 may preferentially check whether a list 1 of a collocated block is referred to.

Thus, the inter prediction apparatus 10 may determine a reference list that is subject to an operation of preferentially checking whether the reference list is referred to, from among reference lists of a collocated block, based on a reference direction from a current block to a collocated picture.

That is, the inter prediction apparatus 10 determines a direction toward a reference list that is subject to an operation of preferentially checking whether the reference list is referred to, from among reference lists of a collocated block, as an opposite direction to the reference direction from the current block to the collocated picture. Thus, if the collocated picture is an image of a list 0 of the current image, whether a list 1 of the collocated block is referred to may be preferentially checked. If the collocated picture is an image of the list 1 of the current image, whether the list 0 of the collocated block is referred to may be preferentially checked.

For example, a reference list that is subject to an operation of preferentially checking whether the reference list is referred to from among reference lists of the collocated block may be determined opposite to a reference direction from the current block to the collocated picture. Thus, when the reference direction from the current block to the collocated picture is expressed by 'colDir', the inter prediction apparatus 10 may determine a reference list that is subject to an operation of preferentially checking whether the reference list is referred to along '1-colDir', from among reference lists of the collocated block.

As another example, when a collocated picture is an image of a list 0 of a current image, a value 'collocated_from_l0_flag' of a current block is 1. When the collocated picture is an image of a list 1 of the current image, the value 'collocated_from_l0_flag' is 0. Thus, the inter prediction apparatus 10 may determine a direction toward a reference list that is subject to an operation of preferentially checking whether the reference list is referred to from among reference lists of the collocated block according to the value 'collocated_from_l0_flag' of the current block.

Thus, the inter prediction apparatus 10 may determine the reference block of the current block by using motion information of a collocated reference list that is selected based on whether the first reference list is referred to.

However, in a low-delay condition, the inter prediction apparatus 10 may determine the reference image of the current block based on the reference list of the current block, instead of the reference list of the collocated block. For example, when a POC number of an image of the collocated block is always smaller than that of the current image, or when a predetermined condition including a GPB prediction mode, in which lists 0 and 1 of reference lists of the current block include the same reference images, is satisfied, an image is decoded in the low-delay condition. In the low-delay condition, the inter prediction apparatus 10 may replace the collocated reference list with the reference list of the current block and then may determine the reference block of the current block by using motion information of the collocated reference list.

Figure 4:
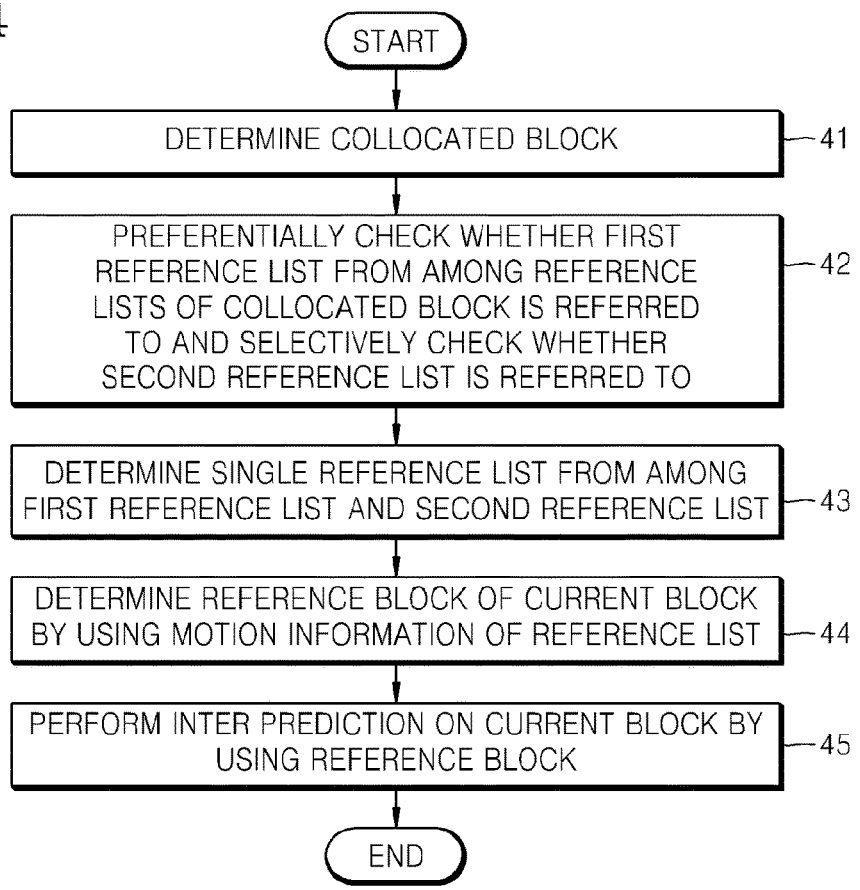
FIG. 4 is a flowchart of an inter prediction method according to an exemplary embodiment.

FIG. 4 is a flowchart of an inter prediction method according to an exemplary embodiment.

In operation 41, a collocated block of a current block of a current image is determined from among blocks of an image that is restored prior to the current image.

In operation 42, whether a first reference list is preferentially referred to from among reference lists of the collocated block is checked, and whether a second reference list is referred to is checked according to whether the first reference list is referred to.

According to the present embodiment, the first reference list may include images that are positioned opposite to a direction from the current image to the collocated block. When the first reference list is referred to for inter prediction of the collocated block, a process of checking whether the second reference list is referred to may be skipped.

In operation 43, based on a result of the checking of operation 42, a single collocated reference list is determined from the first reference list and the second reference list. When a video is decoded in the low-delay condition, the reference list of the current block is determined as a collocated reference list and a reference image may be determined according to the reference list of the current block.

In operation 44, a reference block of the current block is determined by using motion information of the collocated reference list. In operation 45, inter prediction is performed on the current block by using the reference block determined in operation 44.

Thus, in the method of determining a reference image for inter prediction according to the present embodiment, if it is checked that the first reference list of the collocated block is used for inter prediction of the collocated picture, an unnecessary process for rechecking whether the remaining reference lists of the collocated block are referred to may be skipped, thereby increasing the efficiency of inter prediction.

Figure 5:
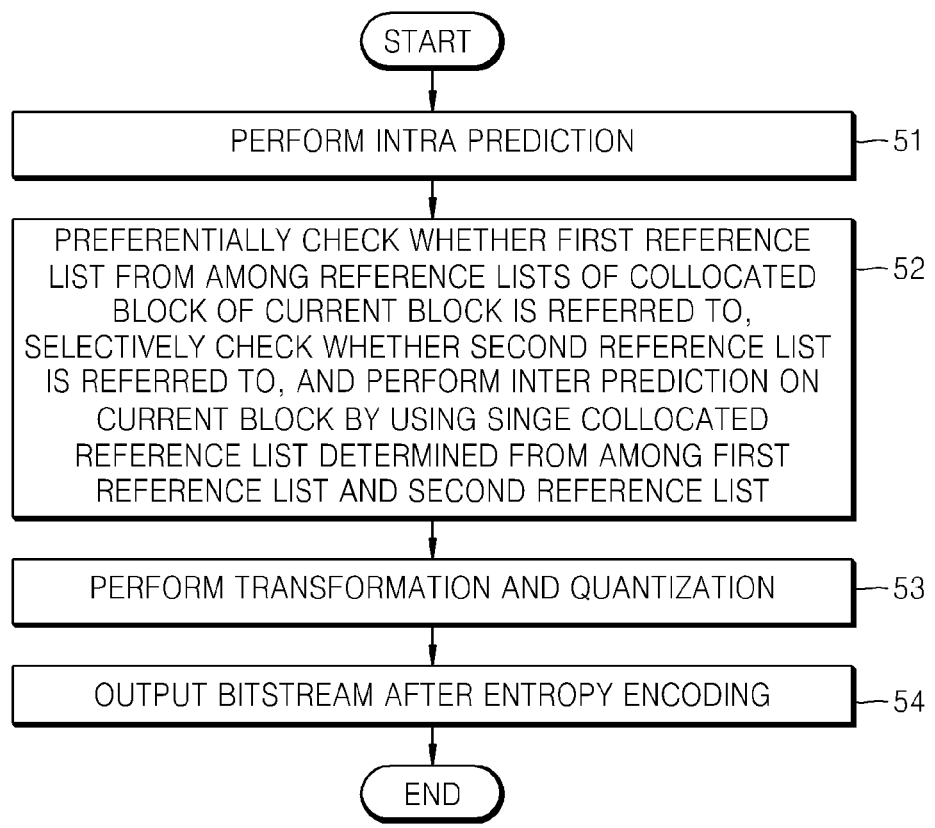
FIG. 5 is a flowchart of a video encoding method via inter prediction according to an exemplary embodiment.

FIG. 5 is a flowchart of a video encoding method via inter prediction according to an exemplary embodiment.

In operation 51, intra prediction is performed on blocks in an intra prediction mode from among blocks of a video.

In operation 52, it is checked whether a first reference list from among reference lists of a collocated block of a current block is preferentially referred to, for inter prediction of the current block in an inter mode. The first reference list may include images that are positioned in an opposite direction to a direction from the current image to the collocated block.

When the first reference list is capable of being referred to, it does not have to be checked whether a second reference list is referred to. When the first reference list is not referred to, whether the second reference list is referred to may be checked. Based on a result of the checking, a single collocated reference list may be determined from among the first reference list and the second reference list and a reference block of the current block may be determined based on motion information of the collocated reference list. Inter prediction may be performed on the current block by using the reference block of the current block to generate a residual value.

In operation 53, transformation and quantization are performed on the result of intra prediction or inter prediction to generate a quantized transformation coefficient. In operation 55, a bitstream generated by performing entropy encoding on samples including the quantized transformation coefficient of operation 53 is output. A parameter 'colDir' indicating a direction toward the collocated picture of the current block or a parameter 'collocated_from_l0_flag' indicating whether the current image of the collocated picture is an image of list 0 may be transmitted.

In addition, during the inter prediction of operation 52, when an image is restored in a low-delay condition, a reference image may be determined according to the reference list of the current block regardless of the collocated reference list.

A video encoding apparatus performing the video encoding method of FIG. 5 may include the inter prediction apparatus 10 according to an exemplary embodiment. The video encoding apparatus including the inter prediction apparatus 10 may perform intra prediction, inter prediction, transformation, and quantization for each image block to generate samples and may perform entropy encoding on the samples to generate a bitstream. In the video encoding apparatus including the inter prediction apparatus 10, the inter prediction apparatus 10 may interact with a video encoding processor or an external video encoding processor, which is mounted in the video encoding apparatus to perform a video encoding operation including transformation, in order to output a video encoding result. According to an exemplary embodiment, in an internal video encoding processor of the video encoding apparatus, since a video encoding apparatus, a central processing apparatus, or a graphic processing apparatus may include a video encoding module as well as a separate processor, a basic video encoding operation may be performed.

Figure 6:
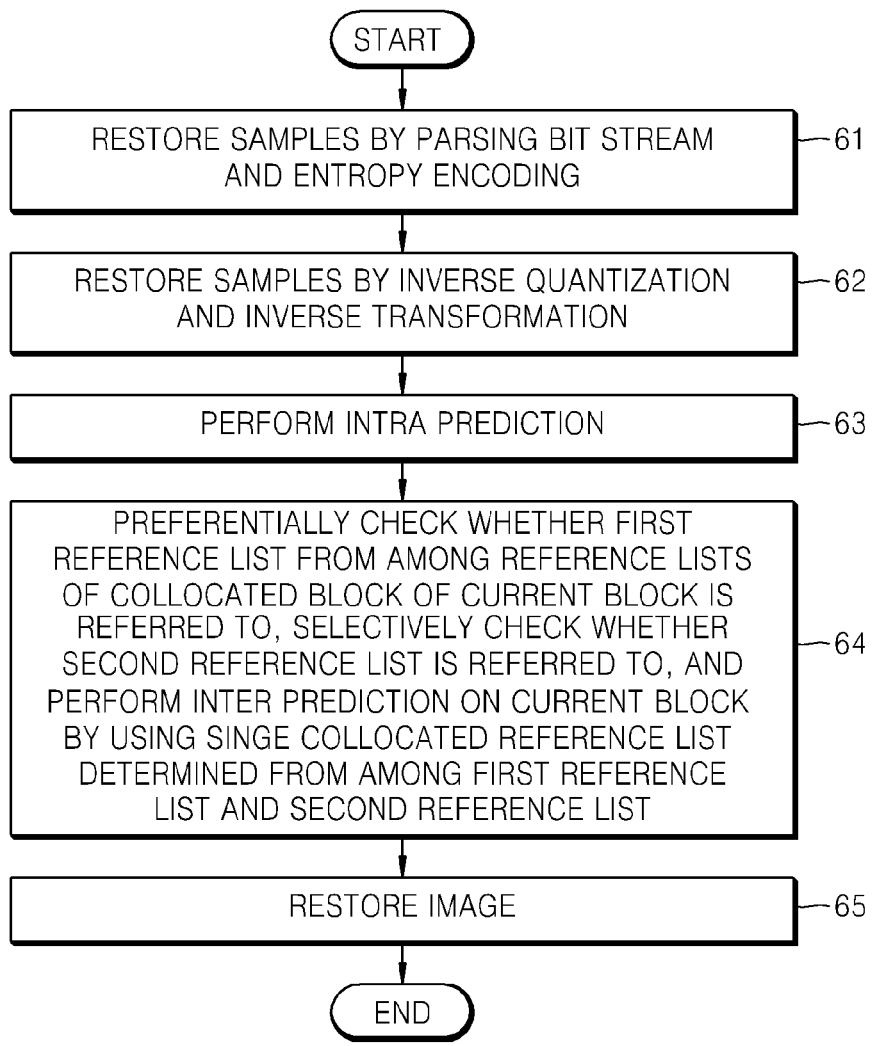
FIG. 6 is a flowchart of a video decoding method via inter prediction according to an exemplary embodiment.

FIG. 6 is a flowchart of a video decoding method via inter prediction according to an exemplary embodiment.

In operation 61, entropy decoding is performed on a bit string obtained by parsing a received bit stream to restore samples. In operation 62, inverse quantization and inverse transformation are performed on a quantized transformation coefficient from among the samples to restore the samples. In operation 63, intra prediction is performed on samples in an intra mode. In operation 64, motion compensation is performed on samples in an inter mode. In operation 65, an image is restored by using blocks that are restored via the intra prediction of operation 63 or the motion compensation of operation 64.

In operation 64, a collocated block of a current block is determined from among samples, for inter prediction of a current block in an inter mode. A parameter 'colDir' indicating a direction toward the collocated picture of the current block or a parameter 'collocated_from_l0_flag' indicating whether the current image of the collocated picture is an image of list 0 may be parsed from a bitstream and restored. The collocated block of the current block may be determined based on the parameter 'colDir' or the parameter 'collocated_from_l0_flag'.

Whether a first reference list from among reference lists of the collocated block is referred to is preferentially checked. The first reference list may include images that are positioned in an opposite direction to a direction from the current image to the collocated block.

When the first reference list is capable of being referred to, it does not have to be checked whether a second reference list is referred to. When the first reference list is not referred to, whether the second reference list is referred to may be checked. Based on a result of the checking, a single collocated reference list may be determined from among the first reference list and the second reference list and a reference block of the current block may be determined based on motion information of the collocated reference list. Motion compensation of the current block may be performed on the current block by using the reference block of the current block to generate a block pixel sample value.

In addition, during the motion compensation of operation 63, when an image is restored in a low-delay condition, a reference image may be determined according to a reference list of the current block, regardless of the collocated reference list.

A video decoding apparatus performing the video decoding method of FIG. 6 may include the inter prediction apparatus 10 according to an exemplary embodiment. The video decoding apparatus including the inter prediction apparatus 10 may parse samples obtained by encoding a bitstream and may perform inverse quantization, inverse transformation, intra prediction, and motion compensation for each image block to restore samples. In the video decoding apparatus, the inter prediction apparatus 10 may interact with a video encoding processor or an external video encoding processor, which is mounted in the video decoding apparatus to perform a video decoding operation including inverse transformation or prediction/compensation, in order to output a video decoding result. According to an exemplary embodiment, in an internal video decoding processor or the video decoding apparatus, since a video decoding apparatus, a central processing apparatus, or a graphic processing apparatus may include a video encoding module as well as a separate processor, a basic video decoding operation may be performed.

In the inter prediction apparatus 10, blocks obtained by dividing video data are divided into coding units having a tree structure and prediction units are used for inter prediction of the coding units, as described above. Hereinafter, with reference to FIGS. 7 through 19, a method and apparatus for encoding a video and a method and apparatus for decoding a video based on a coding unit having a tree structure and a coding unit will be described.

Figure 7:
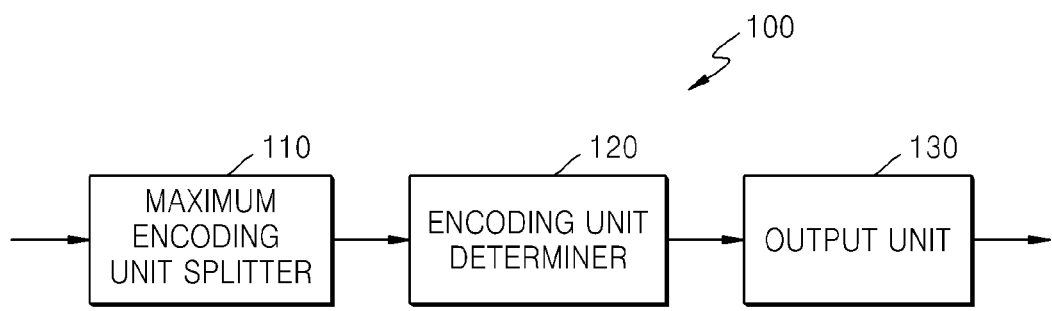
FIG. 7 is a block diagram of a video encoding apparatus based on a coding unit according to a tree structure, according to an exemplary embodiment.

FIG. 7 is a block diagram of a video encoding apparatus 100 based on a coding unit according to a tree structure, according to an exemplary embodiment.

The video encoding apparatus 100 via video prediction based on a coding unit according to a tree structure includes a maximum coding unit splitter 110, a coding unit determiner 120, and an output unit 130 (e.g., an output). Hereinafter, for convenience of description, the video encoding apparatus 100 via video prediction based on a coding unit according to a tree structure is referred to as 'the video encoding apparatus 100'.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation is performed on all of the deeper coding units generated as the depth increases. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit. In order to perform prediction encoding on the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit and the prediction unit may be a partition having the same size as the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a transformation unit that is different from the coding unit. In order to perform the transformation in the coding unit, the transformation may be performed based on a data unit having a size smaller than or equal to the coding unit. For example, the transformation unit for the transformation may include a transformation unit for an intra mode and a data unit for an inter mode.

Similarly to the coding unit according to the tree structure according to the present embodiment, the transformation unit in the coding unit may be recursively split into smaller sized regions and residual data in the coding unit may be divided according to the transformation having the tree structure according to transformation depths.

According to an exemplary embodiment, a transformation depth indicating the number of times splitting is performed to reach the transformation unit by splitting the height and width of the coding unit may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2× N/2, the transformation depth may be set to 2. That is, the transformation unit according to the tree structure may also be set according to the transformation depth.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units and a prediction unit/partition according to a tree structure in a maximum coding unit, and a method of determining a transformation unit, according to exemplary embodiments, will be described in detail later with reference to FIGS. 7 through 19.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit having a maximum size, which is included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a SPS (Sequence Parameter Set) or a picture parameter set (PPS).

In addition, information about a maximum size of a transformation unit and information about a minimum size of a transformation, which are acceptable for a current video may also be output via a header of a bitstream, a SPS or a PPS. The output unit 130 may encode and output reference information, prediction information, single-direction prediction information, and information about a slice type including a fourth slice type, which are related to prediction described with reference to FIGS. 1 through 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum value 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 7 may perform the operation of the inter prediction apparatus 10 as described with reference to FIG. 1.

The coding unit determiner 120 may perform an operation of the inter prediction apparatus 10. For each maximum coding unit, a prediction unit for inter prediction may be determined in coding units according to a tree structure and inter prediction may be performed in prediction units.

In particular, whether a first reference list from among reference lists of a collocated block of a current block is referred to is preferentially checked, for inter prediction of a current prediction unit in a prediction mode. The first reference list may include images that are positioned in an opposite direction to a direction from the current image to the collocated block.

When the first reference list is capable of being referred to, it does not have to be checked whether a second reference list is referred to. When the first reference list is not referred to, whether the second reference list is referred to may be checked. Based on a result of the checking, a single collocated reference list may be determined from among the first reference list and the second reference list and a reference block of a current prediction unit may be determined based on motion information of the collocated reference list. Inter prediction may be performed on the current prediction unit by using the reference block of the current prediction unit to generate a residual value. A parameter 'collocated_from_l0_flag' or a parameter 'colDir' indicating a collocated block of the current prediction unit may be transmitted.

Figure 8:
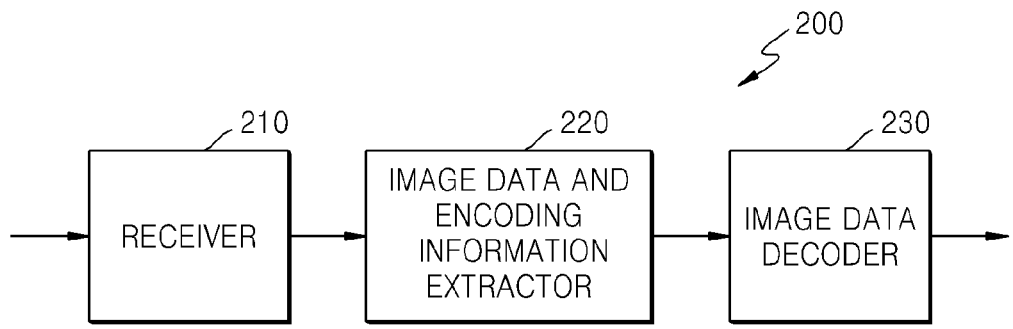
FIG. 8 is a block diagram of a video decoding apparatus based on a coding unit according to a tree structure, according to an exemplary embodiment.

FIG. 8 is a block diagram of a video decoding apparatus 200 based on a coding unit according to a tree structure, according to an exemplary embodiment.

The video decoding apparatus 200 based on the coding unit according to the tree structure includes a receiver 210, an image data and encoding information extractor 220, and an image data decoder 230. Hereinafter, for convenience of description, the video decoding apparatus 200 using video prediction based on a coding unit according to a tree structure will be referred to as the 'video decoding apparatus 200'.

Definitions of various terms, such as a coding unit, a depth, a prediction unit, a transformation unit, and information about various encoding modes, for decoding operations of the video decoding apparatus 200 are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read transformation unit information according to a tree structure for each coding unit so as to determine transform units for each coding unit and perform inverse transformation based on a transformation unit for each coding unit, for inverse transformation for each maximum coding unit. Via the inverse transformation, a pixel value of a spatial region of the coding unit may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. For each coding unit determined as described above, information about an encoding mode may be obtained so as to decode the current coding unit.

The image data decoder 230 of the video decoding apparatus 200 of FIG. 8 may perform the operation of the inter prediction apparatus 10 as described above with reference to FIG. 1.

The image data decoder 230 may determine a prediction unit for inter prediction for each coding unit according to a tree structure and may perform inter prediction for each prediction unit, for a maximum coding unit.

In particular, a collocated block of a current block is determined from among restored samples, for inter prediction of a current block in an inter mode. A collocated block of a current prediction unit may be determined based on a parameter 'collocated_from_l0_flag' or a parameter 'colDir' that is a current prediction unit obtained by parsing a bitstream.

Whether a first reference list is referred to from among reference lists of the collocated block is preferentially checked. The first reference list may include images that are positioned in and opposite direction to a direction from the current image to the collocated block.

When the first reference list is capable of being referred to, it does not have to be checked whether a second reference list is referred to. When the first reference list is not referred to, whether the second reference list is referred to may be checked. Based on a result of the checking, a single collocated reference list may be determined from among the first reference list and the second reference list and a reference block of the current prediction unit may be determined based on motion information of the collocated reference list. Motion compensation may be performed on the current prediction unit by using the reference block of the current prediction unit to generate a block pixel sample value.

In addition, when an image is restored in a low-delay condition, a reference image may be determined according to a reference list of the current prediction unit regardless of the collocated reference list.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of a coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 9:
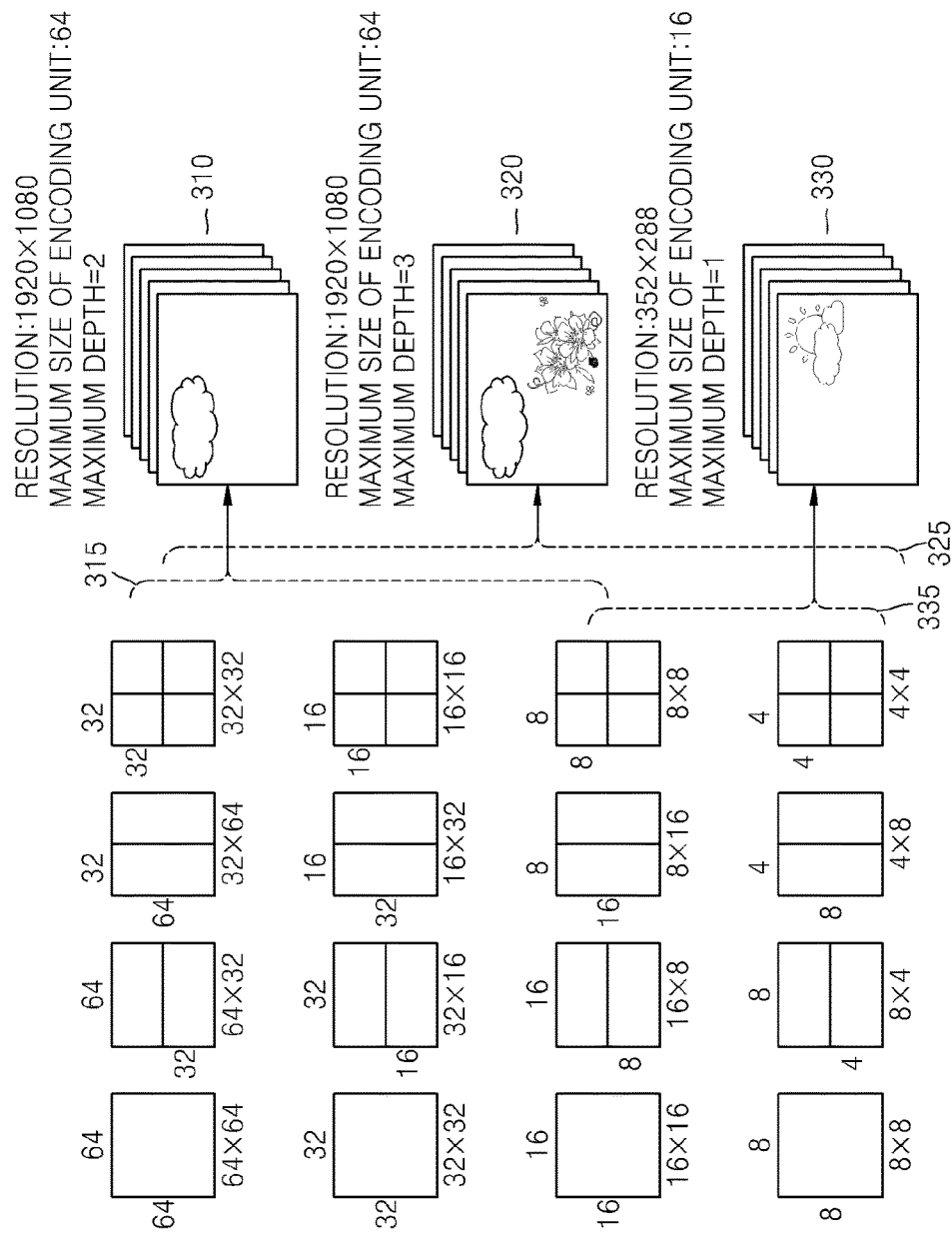
FIG. 9 is a diagram for describing a concept of coding units according to an exemplary embodiment.

FIG. 9 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth increases, detailed information may be precisely expressed.

Figure 10:
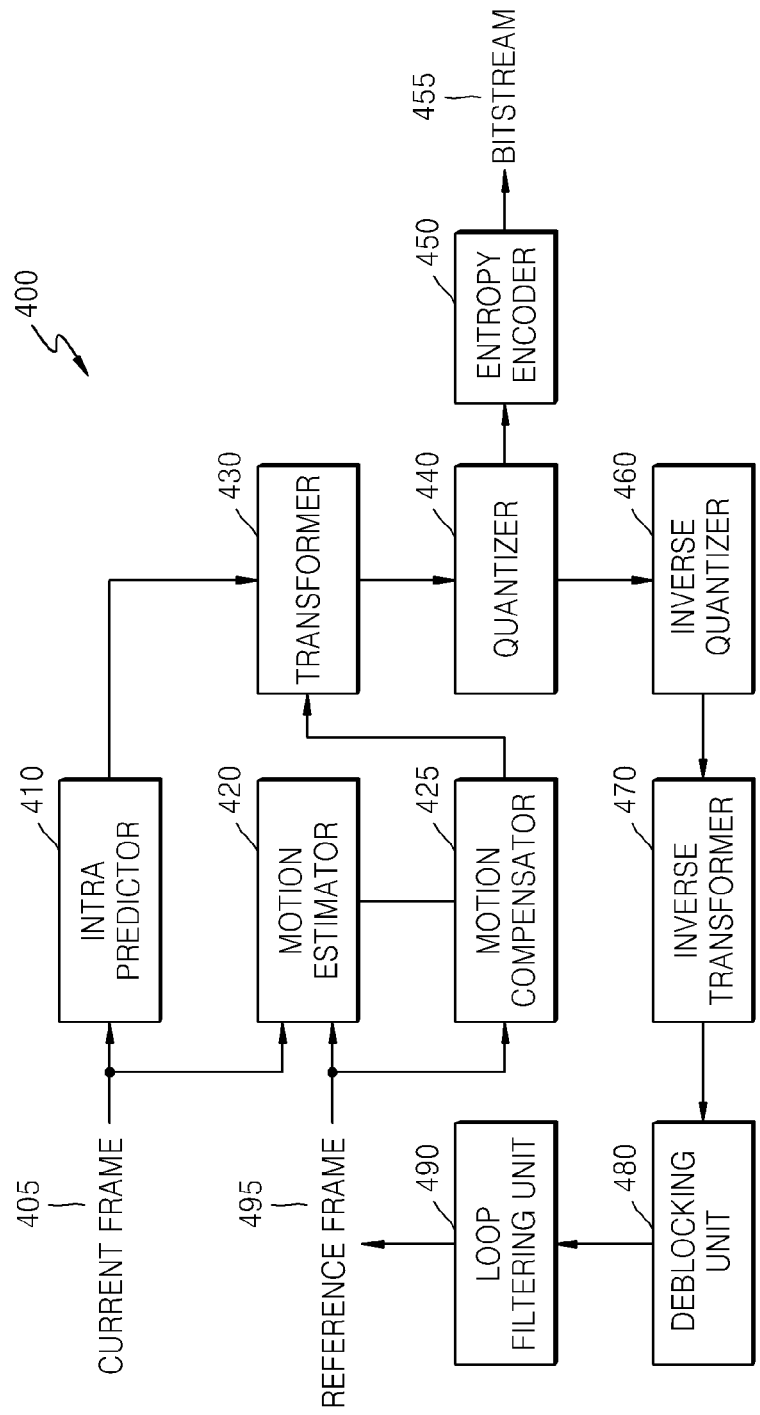
FIG. 10 is a block diagram of an image encoder based on coding units according to an exemplary embodiment.

FIG. 10 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 (e.g., a deblocker) and a loop filtering unit 490 (e.g., a loop filterer). The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

In particular, in order to determine a reference image for inter prediction of a current prediction unit, the motion compensator 425 preferentially checks whether a first reference list of a collocated block is referred to, and does not recheck whether the remaining reference lists of the collocated block are referred to when motion information of the first reference list exists since the first reference list of the collocated block is preferentially referred to. However, when the motion information of the first reference list does not exist since the first reference list of the collocated block is not referred to, the motion compensator 425 may recheck whether the remaining reference lists of the collocated block are referred to. The motion compensator 425 may determine a reference list of the current prediction unit by using the reference list of the collocated block on which the check operation has been performed.

Figure 11:
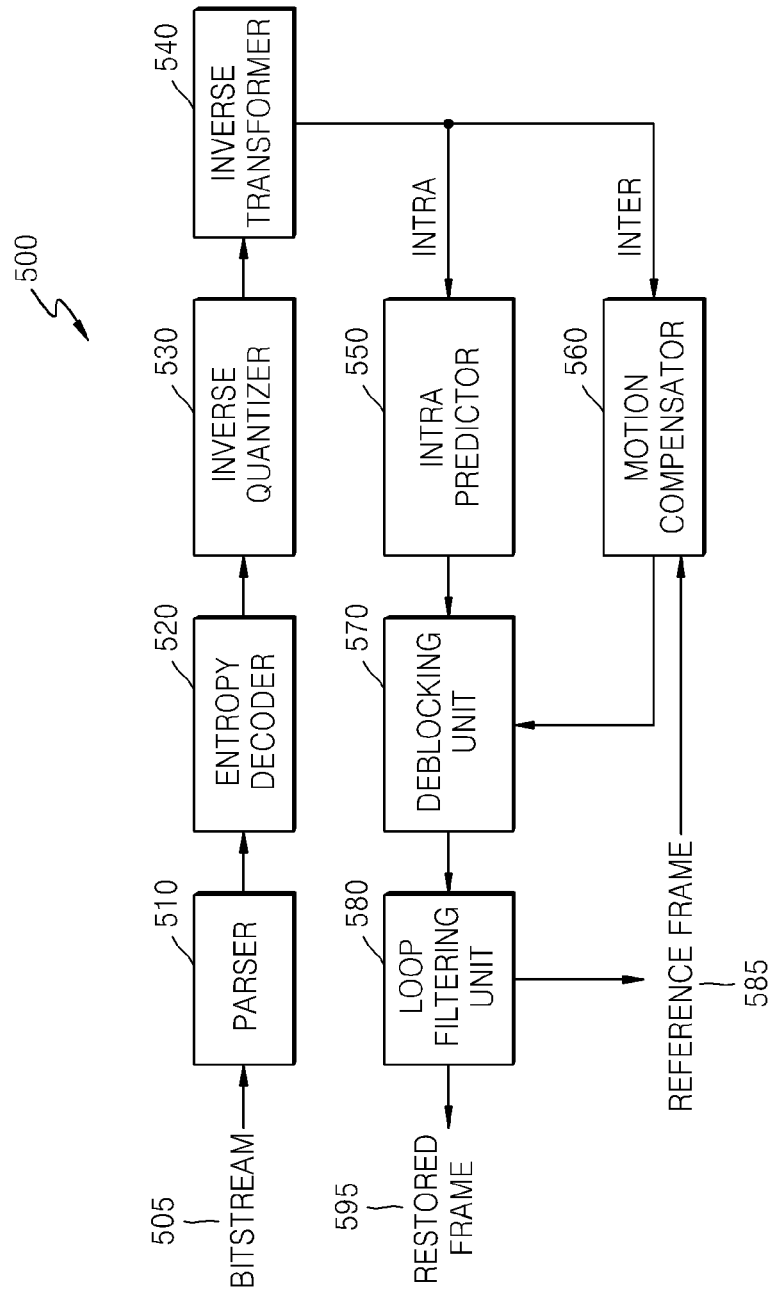
FIG. 11 is a block diagram of an image decoder based on coding units according to an exemplary embodiment.

FIG. 11 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 (e.g., a deblocker) and a loop filtering unit 580 (e.g., a loop filterer). Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510 performs an operation.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

In particular, in order to determine a reference image for inter prediction of a current prediction unit, the motion compensator 560 preferentially checks whether a first reference list of a collocated block is referred to, and does not recheck whether the remaining reference lists of the collocated block are referred to when motion information of the first reference list exists since the first reference list of the collocated block is preferentially referred to. However, when the motion information of the first reference list does not exist since the first reference list of the collocated block is not referred to, the motion compensator 560 may recheck whether the remaining reference lists of the collocated block are referred to. The motion compensator 560 may determine a reference list of the current prediction unit by using the reference list of the collocated block on which the check operation has been performed.

Figure 12:
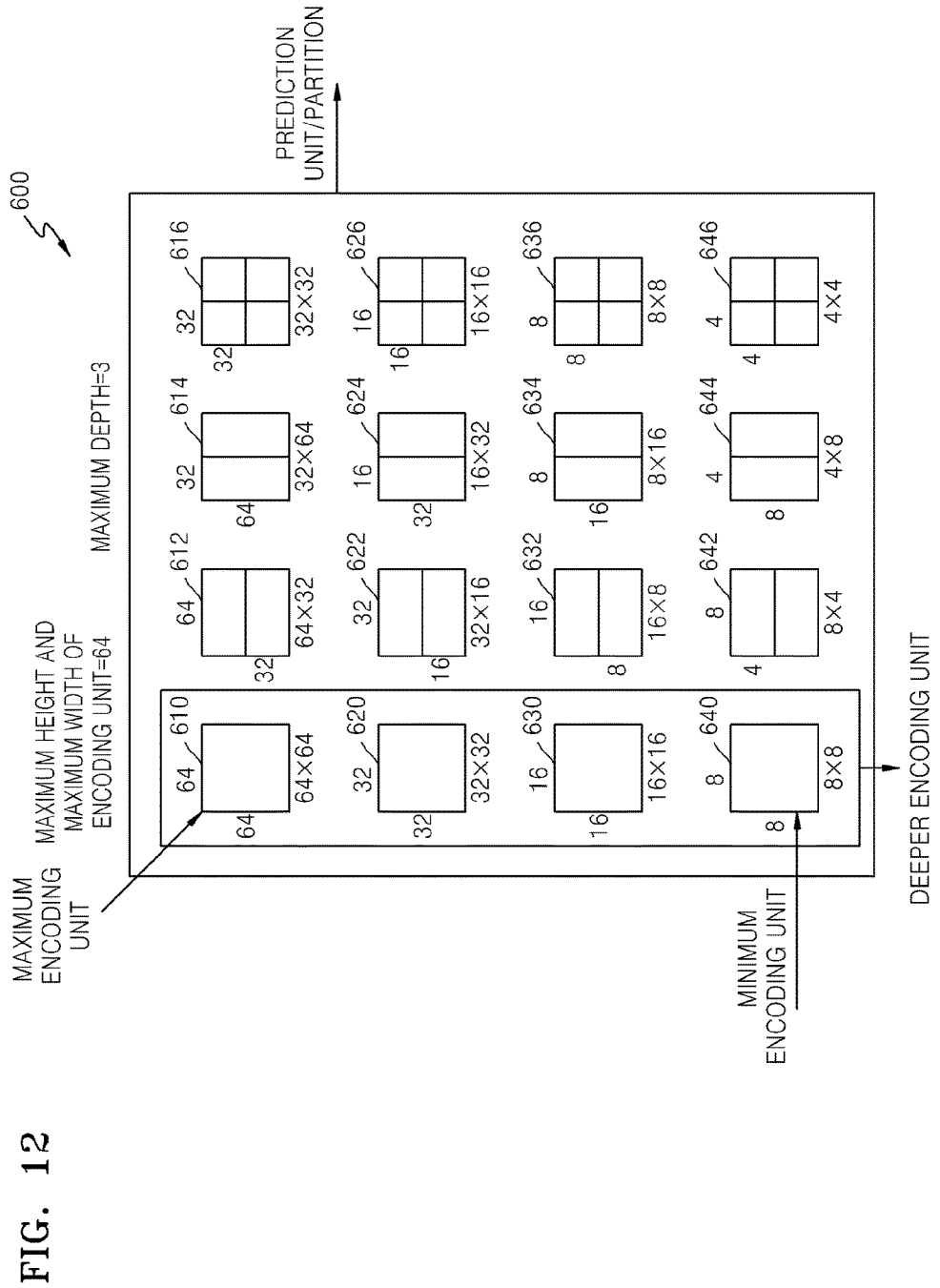
FIG. 12 is a diagram illustrating deeper coding units according to depths, and partitions according to an exemplary embodiment.

FIG. 12 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth refers to a total number of times the coding unit is split from the maximum coding unit to the minimum coding unit. Since a depth increases along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth increases along the vertical axis of the hierarchical structure 600. A depth and a partition having the minimum encoding error in the coding unit 610 may be selected as the coded depth and a partition type of the coding unit 610.

Figure 13:
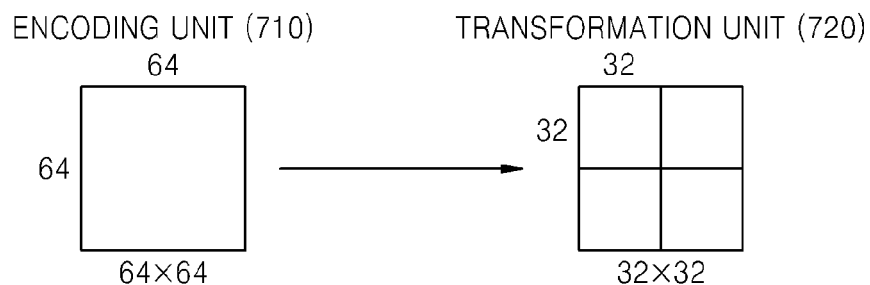
FIG. 13 is a diagram for describing a relationship between a coding unit and transformation units, according to an exemplary embodiment.

FIG. 13 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 14:
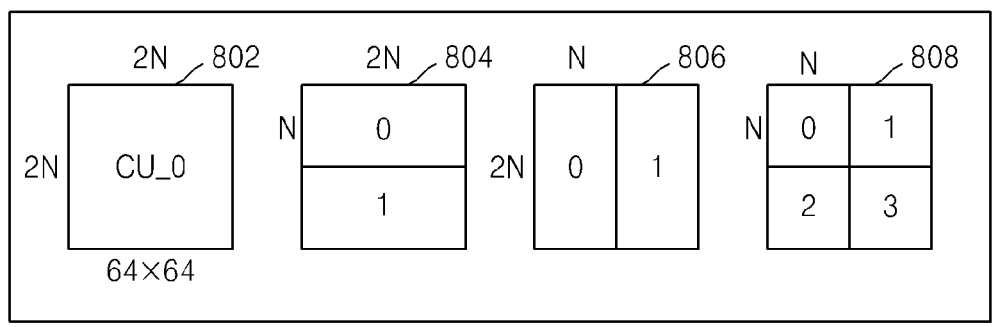
FIG. 14 is a diagram for describing encoding information of coding units corresponding to a coded depth, according to an exemplary embodiment.
Figure 14:
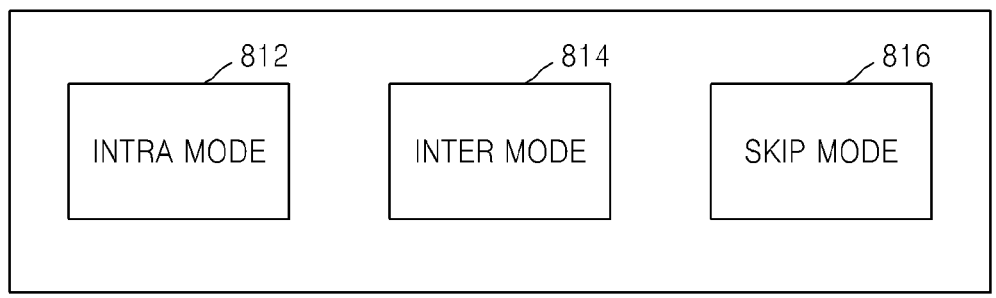
Figure 14:
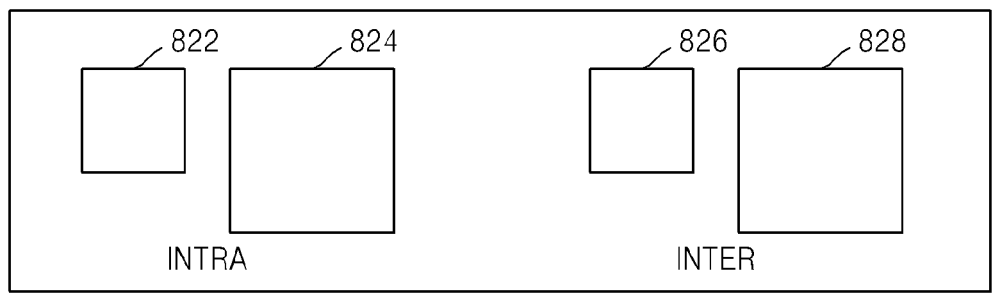

FIG. 14 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 15:
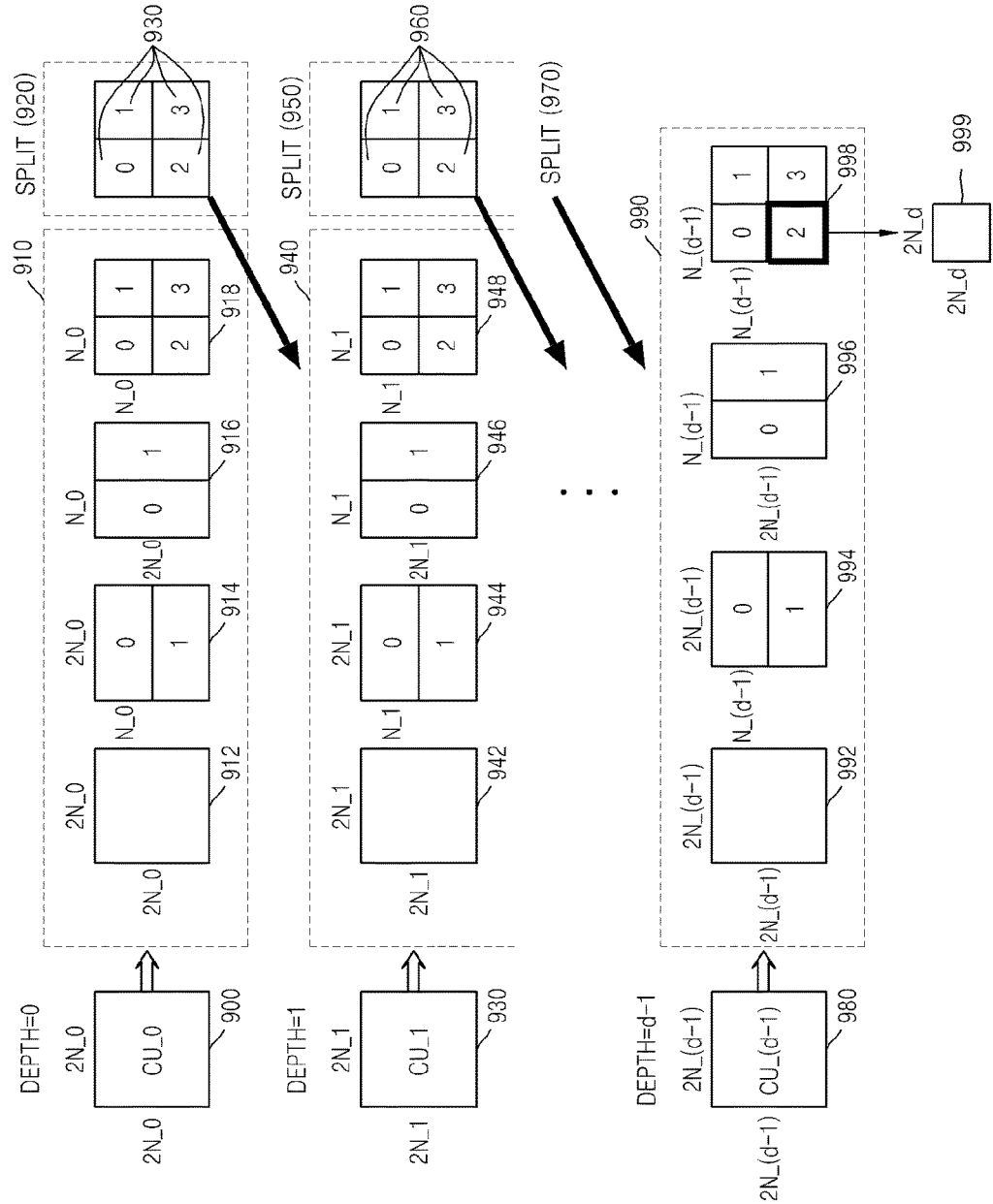
FIG. 15 is a diagram of deeper coding units according to depths, according to an exemplary embodiment.

FIG. 15 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 15 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 16:
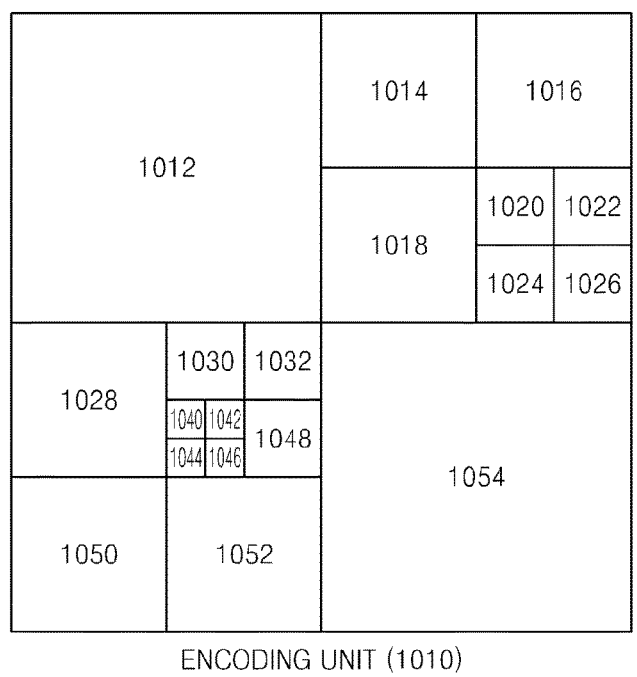
FIGS. 16 through 18 are diagrams for describing a relationship between coding units, prediction units, and transformation units, according to an exemplary embodiment.
Figure 17:
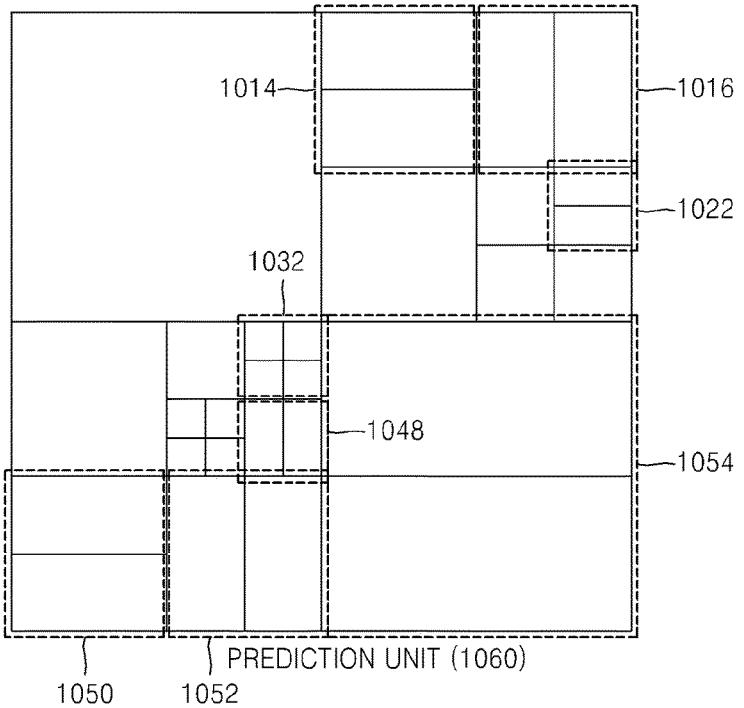
Figure 18:
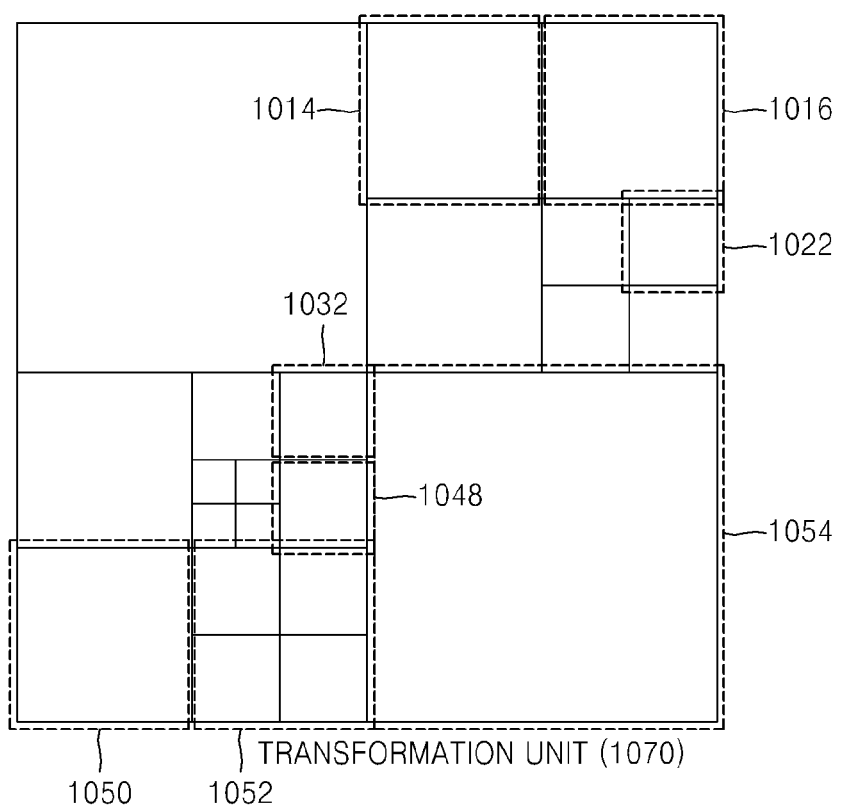

FIGS. 16 through 18 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2N × 2N and Current Depth of d) | | | | Split Information 1 |
|---|---|---|---|---|---|
| Prediction Mode | Partition Type | | Size of Transformation Unit | | |
| Intra Inter Skip (Only 2N × 2N) | Symmetrical Partition Type 2N × 2N 2N × N N × 2N N × N | Asymmetrical Partition Type 2N × nU 2N × nD nL × 2N nR × 2N | Split Information 0 of Transformation Unit 2N × 2N | Split Information 1 of Transformation Unit N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 19:
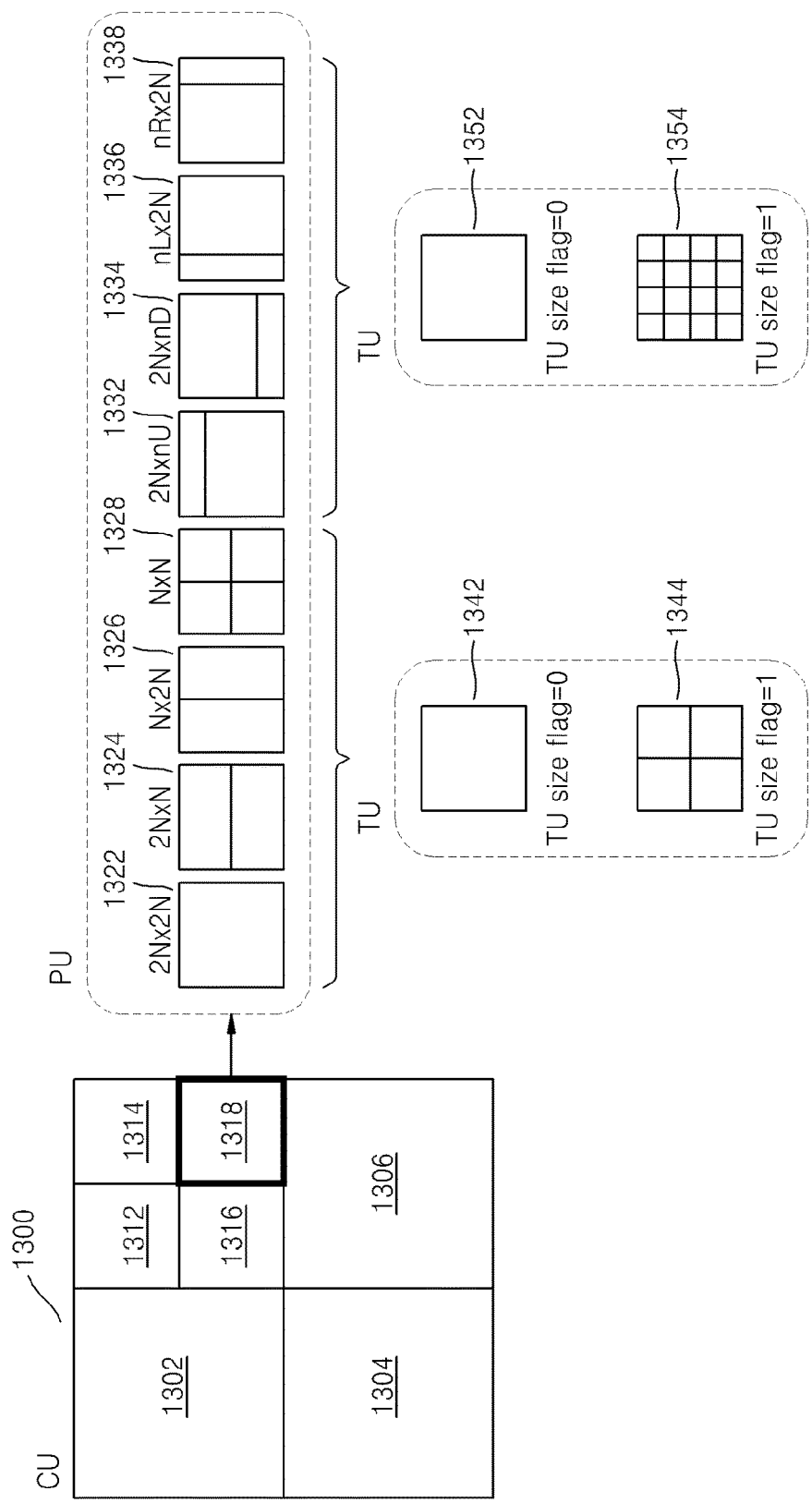
FIG. 19 is a diagram for describing a relationship between a coding unit, a prediction unit or a partition, and a transformation unit, according to encoding mode information of Table 1.

FIG. 19 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU (Transformation Unit) size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the exemplary embodiments are not limited thereto.

According to the video encoding method based on coding units having a tree structure as described with reference to FIGS. 7 through 19, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

Exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While exemplary embodiments been particularly shown and described with reference to the drawings, it will be understood by those of ordinary skill in the art that various changes in form and details may be made therein without departing from the spirit and scope of the inventive concept as defined by the following claims.

The invention claimed is:

1. A method of inter prediction, the method comprising:
checking whether at least one of a reference list L0 and a reference list L1 of the collocated block is referred to;
in response to the checking, when a collocated picture of a current block is determined in the reference list L0 of the current block, determining the reference list L1 of the collocated block as the collocated reference list to be referred to for motion vector prediction of the current block;
in response to the checking, when the collocated picture is determined in a reference list L1 of the current block, determining a reference list L0 of the collocated block as the collocated reference list;
in response to the checking, when a picture order count (POC) number of the collocated picture is always smaller than that of current picture including the current block, obtaining a motion vector corresponding to a reference list of the collocated block which is identical to a reference list of the current block; and
performing inter prediction on the current bock by using a motion vector corresponding to the collocated reference list.

2. The method of claim 1, wherein the collocated block is a block is co-located with a block location of the current block, in a collocated picture which is determined among pictures decoded prior to the current picture, and
wherein the reference list L0 of the collocated block includes one or more reference images ahead of the collocated picture, and the reference list L1 of the collocated block includes one or more reference images behind the collocated picture.

* * * * *